(12) United States Patent
Huang et al.

(10) Patent No.: US 10,812,156 B2
(45) Date of Patent: Oct. 20, 2020

(54) SYNCHRONIZATION BEAM SENDING AND RECEIVING METHOD, NETWORK DEVICE, TERMINAL, AND SYSTEM

(71) Applicant: HUAWEI TECHNOLOGIES CO., LTD., Shenzhen, Guangdong (CN)

(72) Inventors: Huang Huang, Shenzhen (CN); Kun Zeng, Chengdu (CN); Kunpeng Liu, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/351,859

(22) Filed: Mar. 13, 2019

(65) Prior Publication Data
US 2019/0215035 A1 Jul. 11, 2019

Related U.S. Application Data

(63) Continuation of application No. PCT/CN2017/097413, filed on Aug. 14, 2017.

(30) Foreign Application Priority Data

Sep. 14, 2016 (CN) .......................... 2016 1 0825682

(51) Int. Cl.
*H04B 7/0426* (2017.01)
*H04B 7/06* (2006.01)
*H04W 72/04* (2009.01)

(52) U.S. Cl.
CPC ............ *H04B 7/043* (2013.01); *H04B 7/063* (2013.01); *H04B 7/0617* (2013.01);
(Continued)

(58) Field of Classification Search
CPC combination set(s) only.
See application file for complete search history.

(56) References Cited

U.S. PATENT DOCUMENTS 9,954,632 B2 * 4/2018 Hahn, III ............... H04J 3/1694
10,219,232 B2 * 2/2019 Yu ....................... H04W 56/001
(Continued)

FOREIGN PATENT DOCUMENTS

| CN | 101316126 A | 12/2008 |
|---|---|---|
| CN | 102246425 A | 11/2011 |

(Continued)

OTHER PUBLICATIONS

Office Action issued in Chinese Application No. 201610825682.9, dated Apr. 19, 2019, 6 pages.
(Continued)

*Primary Examiner* — Linda Wong
(74) *Attorney, Agent, or Firm* — Fish & Richardson P.C.

(57) ABSTRACT

The present disclosure relates to synchronization beam sending and receiving methods, network devices, terminals, and systems. One example synchronization beam sending method includes sending, by a network device, at least one first subframe to a terminal, where the at least one first subframe includes at least one first beam identifier and at least one second beam identifier, a first beam corresponding to the first beam identifier is a beam in a first beam set, a second beam corresponding to the second beam identifier is a beam in a second beam set, an intersection set of the first beam set and the second beam set is empty, and the first beam identifier and the second beam identifier are different.

20 Claims, 10 Drawing Sheets

(52) U.S. Cl.
CPC ........ *H04B 7/0695* (2013.01); *H04W 72/046* (2013.01); *H04W 72/0446* (2013.01)

(56) References Cited

U.S. PATENT DOCUMENTS

| | | | |
|---|---|---|---|
| 10,236,946 B2* | 3/2019 | Park | G01S 5/00 |
| 10,305,561 B2* | 5/2019 | Baek | H04B 7/0617 |
| 10,644,780 B2* | 5/2020 | Li | H04W 72/046 |
| 2010/0142462 A1 | 6/2010 | Wang et al. | |
| 2010/0202553 A1* | 8/2010 | Kotecha | H04B 7/0639 375/267 |
| 2013/0039345 A1 | 2/2013 | Kim et al. | |
| 2013/0156120 A1 | 6/2013 | Josiam et al. | |
| 2014/0198681 A1* | 7/2014 | Jung | H04B 7/088 370/252 |
| 2015/0304868 A1 | 10/2015 | Yu et al. | |
| 2016/0054115 A1* | 2/2016 | Snis | B23K 15/02 419/55 |
| 2016/0127919 A1 | 5/2016 | Hui et al. | |
| 2016/0338033 A1 | 11/2016 | Xiao et al. | |
| 2016/0360531 A1* | 12/2016 | Moon | H04W 72/0453 |
| 2016/0373180 A1 | 12/2016 | Guo et al. | |
| 2017/0142652 A1* | 5/2017 | Liu | H04W 52/0206 |
| 2017/0273062 A1* | 9/2017 | Liu | H04B 7/0617 |
| 2017/0288754 A1* | 10/2017 | Tomeba | H04W 16/28 |
| 2017/0367030 A1 | 12/2017 | Liu et al. | |
| 2018/0109303 A1* | 4/2018 | Yoo | H04W 72/085 |
| 2018/0167174 A1* | 6/2018 | Lu | H04W 72/04 |
| 2019/0215045 A1* | 7/2019 | Choi | H04B 7/0617 |

FOREIGN PATENT DOCUMENTS

| | | |
|---|---|---|
| CN | 103716081 A | 4/2014 |
| CN | 103875191 A | 6/2014 |
| CN | 104735685 A | 6/2015 |
| CN | 104796185 A | 7/2015 |
| WO | 2016091223 A1 | 6/2016 |

OTHER PUBLICATIONS

Partial Supplementary European Search Report issued in Application No. 17850160.7, dated Jul. 16, 2019, 19 pages.

PCT International Search Report and Written Opinion in International Application No. PCT/CN2017/097,413, dated Oct. 27, 2017, 17 pages (With English Translation).

Office Action issued in Chinese Application No. 201610825682.9 dated Aug. 27, 2020, 5 pages.

* cited by examiner

SYNCHRONIZATION BEAM SENDING AND RECEIVING METHOD, NETWORK DEVICE, TERMINAL, AND SYSTEM

CROSS-REFERENCE TO RELATED APPLICATIONS

This application is a continuation of International Application No. PCT/CN2017/097413, filed on Aug. 14, 2017, which claims priority to Chinese Patent Application No. 201610825682.9, filed on Sep. 14, 2016. The disclosures of the aforementioned applications are hereby incorporated by reference in their entireties.

TECHNICAL FIELD

This application relates to communications technologies, and in particular, to a synchronization beam sending and receiving method, a network device, a terminal, and a system.

BACKGROUND

Conventional operating bands for mobile communication are primarily low frequency bands lower than 3 GHz. As the mobile communication continuously develops, especially in a study of a 5G mobile communications system, the operating bands for the mobile communication gradually shift to high frequency bands (frequency bands higher than 6 GHz) having richer spectrum resources, to resolve a problem that spectrum resources in conventional low frequency bands are in a shortage. To overcome an inherent high path loss defect of the high frequency bands, a physical layer needs to use a narrow beam antenna having a high gain to improve link coverage, so that when communication is performed in the high frequency bands, a network side and a terminal side need to perform synchronization beam scanning.

In the prior art, when a network side device and a terminal side device perform synchronization beam scanning, beams of particular widths may be selected for scanning. As a wider beam is selected, a smaller quantity of beams are needed to cover a particular area, anti-mobility of the network side device is better, and overheads are smaller. As a narrower beam is selected, a signal-to-noise ratio (SNR for short) is greater, and signal quality is better.

Therefore, there is an urgent need for a more appropriate synchronization beam scanning solution.

SUMMARY

This application provides a synchronization beam sending and receiving method, a network device, a terminal, and a system, to achieve a more appropriate synchronization beam scanning solution.

A first aspect of this application provides a synchronization beam sending method, and the method is described from the perspective of a network device. In this method, a network device sends at least one first subframe to a terminal, where the at least one first subframe includes at least one first beam identifier and at least one second beam identifier, a first beam corresponding to the first beam identifier is a beam in a first beam set, a second beam corresponding to the second beam identifier is a beam in a second beam set, an intersection set of the first beam set and the second beam set is empty, and the first beam identifier and the second beam identifier are different.

The network device sends different beams in two different sets to the terminal, so that fewer beams are used in beam scanning, anti-mobility is desirable, and an SNR can also be ensured, thereby meeting requirements of a communications system on the anti-mobility and the SNR.

In a possible embodiment of the method, widths of beams in the first beam set are greater than widths of beams in the second beam set.

In a possible embodiment of the method, the at least one first subframe further includes at least one third beam identifier, a third beam corresponding to the third beam identifier is a beam in a third beam set, and widths of beams in the third beam set are less than widths of beams in the second beam set.

Beams of three different widths are sent in the first subframe, so that an approximate range of the terminal may be first determined by using a wide beam, and then scanning on more precise ranges is performed by using a medium beam and a narrow beam, thereby meeting the requirements on the anti-mobility and the SNR.

In a possible embodiment of the method, a sending period of the first beam is less than or equal to a sending period of the second beam.

In another possible embodiment, the method further includes: receiving, by the network device, at least one second subframe sent by the terminal, where the at least one second subframe includes at least one fourth beam identifier and at least one fifth beam identifier, a fourth beam corresponding to the fourth beam identifier corresponds to the first beam, a fifth beam corresponding to the fifth beam identifier corresponds to the second beam, a width of the fourth beam is equal to a width of the first beam, and a width of the fifth beam is equal to a width of the second beam.

In another possible embodiment, the method further includes:

receiving, by the network device, at least one third subframe sent by the terminal, where the at least one third subframe includes at least two sixth beam identifiers and at least two seventh beam identifiers, two sixth beams corresponding to every two sixth beam identifiers correspond to one first beam, two seventh beams corresponding to every two seventh beam identifiers correspond to one second beam, a width of the sixth beam is less than a width of the first beam, and a width of the seventh beam is less than a width of the second beam.

Two beams corresponding to one beam in a downlink subframe are added during uplink channel access, so that more terminals can be scanned, thereby further increasing user access efficiency.

In another possible embodiment, the method further includes:

sending, by the network device, the first beam by using a first synchronization signal; and sending, by the network device, the second beam by using a second synchronization signal.

In another possible embodiment, a synchronization sequence used by the first synchronization signal is different from a synchronization sequence used by the second synchronization signal.

In another possible embodiment, the first synchronization signal and the second synchronization signal are located in different frequency bands.

In another possible embodiment, the synchronization sequences used by the first synchronization signal and the second synchronization signal are different Zadoff-Chu sequences generated after cyclic shifts.

A second aspect of this application provides a synchronization beam receiving method, and the method includes:

receiving, by a terminal, at least one first subframe sent by a network device, where the at least one first subframe includes at least one first beam identifier and at least one second beam identifier, a first beam corresponding to the first beam identifier is a beam in a first beam set, a second beam corresponding to the second beam identifier is a beam in a second beam set, an intersection set of the first beam set and the second beam set is empty, and the first beam identifier and the second beam identifier are different;

determining, by the terminal, a target transmit beam based on the at least one first subframe; and sending, by the terminal, a target transmit beam identifier corresponding to the target transmit beam to the network device.

In a possible embodiment, a specific method for determining, by the terminal, the target transmit beam still based on the at least one first subframe is specifically:

using, by the terminal, a beam of maximum receive power as the target transmit beam based on receive power of the first beam corresponding to the first beam identifier in the received first subframe, and receive power of the second beam corresponding to the second beam identifier in the first subframe.

A third aspect of this application provides a network device, including:

a sending module, configured to send at least one first subframe to a terminal, where the at least one first subframe includes at least one first beam identifier and at least one second beam identifier, a first beam corresponding to the first beam identifier is a beam in a first beam set, a second beam corresponding to the second beam identifier is a beam in a second beam set, an intersection set of the first beam set and the second beam set is empty, and the first beam identifier and the second beam identifier are different.

In a possible embodiment, widths of beams in the first beam set are greater than widths of beams in the second beam set.

In a possible embodiment, the at least one first subframe further includes at least one third beam identifier, a third beam corresponding to the third beam identifier is a beam in a third beam set, and widths of beams in the third beam set are less than widths of beams in the second beam set.

In a possible embodiment, a sending period of the first beam is less than or equal to a sending period of the second beam.

In a possible embodiment, the network device further includes a receiving module, configured to receive at least one second subframe sent by the terminal, where the at least one second subframe includes at least one fourth beam identifier and at least one fifth beam identifier, a fourth beam corresponding to the fourth beam identifier corresponds to the first beam, a fifth beam corresponding to the fifth beam identifier corresponds to the second beam, a width of the fourth beam is equal to a width of the first beam, and a width of the fifth beam is equal to a width of the second beam.

In a possible embodiment, the receiving module is further configured to receive at least one third subframe sent by the terminal, where the at least one third subframe includes at least two sixth beam identifiers and at least two seventh beam identifiers, two sixth beams corresponding to every two sixth beam identifiers correspond to one first beam, two seventh beams corresponding to every two seventh beam identifiers correspond to one second beam, a width of the sixth beam is less than a width of the first beam, and a width of the seventh beam is less than a width of the second beam.

In a possible embodiment, the sending module includes a first sending unit and a second sending unit. The first sending unit is configured to send the first beam by using a first synchronization signal; and the second sending unit is configured to send the second beam by using a second synchronization signal.

In a possible embodiment, a synchronization sequence used by the first synchronization signal is different from a synchronization sequence used by the second synchronization signal.

In a possible embodiment, the first synchronization signal and the second synchronization signal are located in different frequency bands.

In a possible embodiment, the synchronization sequences used by the first synchronization signal and the second synchronization signal are different Zadoff-Chu sequences generated after cyclic shifts.

A fourth aspect of this application provides a terminal, including:

a receiving module, configured to receive at least one first subframe sent by a network device, where the at least one first subframe includes at least one first beam identifier and at least one second beam identifier, a first beam corresponding to the first beam identifier is a beam in a first beam set, a second beam corresponding to the second beam identifier is a beam in a second beam set, an intersection set of the first beam set and the second beam set is empty, and the first beam identifier and the second beam identifier are different;

a processing module, configured to determine a target transmit beam based on the at least one first subframe; and a sending module, configured to send a target transmit beam identifier corresponding to the target transmit beam to the network device.

In a possible embodiment, the processing module is specifically configured to use a beam of maximum receive power as the target transmit beam based on receive power of the first beam corresponding to the first beam identifier in the received first subframe, and receive power of the second beam corresponding to the second beam identifier in the first subframe.

A fifth aspect of this application provides a network device, including at least a processor and a memory. The memory is configured to store computer executable program code, and the processor is configured to perform the following method:

sending at least one first subframe to a terminal, where the at least one first subframe includes at least one first beam identifier and at least one second beam identifier, a first beam corresponding to the first beam identifier is a beam in a first beam set, a second beam corresponding to the second beam identifier is a beam in a second beam set, an intersection set of the first beam set and the second beam set is empty, and the first beam identifier and the second beam identifier are different.

A sixth aspect of this application provides a terminal, including at least a processor and a memory. The memory is configured to store computer executable program code, and the processor is configured to perform the following method:

receiving at least one first subframe sent by a network device, where the at least one first subframe includes at least one first beam identifier and at least one second beam identifier, a first beam corresponding to the first beam identifier is a beam in a first beam set, a second beam corresponding to the second beam identifier is a beam in a second beam set, an intersection set of the first beam set and the second beam set is empty, and the first beam identifier and the second beam identifier are different;

determining a target transmit beam based on the at least one first subframe; and sending a target transmit beam identifier corresponding to the target transmit beam to the network device.

A seventh aspect of this application provides a computer storage medium, configured to store computer software instructions used by the network device in the first aspect. The computer storage medium includes a program designed for executing the first aspect.

An eighth aspect of this application provides a computer storage medium, configured to store computer software instructions used by the terminal in the second aspect. The computer storage medium includes a program designed for executing the second aspect.

A ninth aspect of this application provides a synchronization beam receiving and sending system, including the network device and the terminal described above.

Compared with the prior art, the technical solution provided in this application can achieve the anti-mobility of beam scanning and ensure the SNR, and therefore, can meet the requirements of the communications system on the mobility and the SNR.

DESCRIPTION OF EMBODIMENTS

The technical solutions of this application may be applied to various communications systems, such as a Global System for Mobile Communications ("GSM" for short) system, a Code Division Multiple Access ("CDMA" for short) system, a Wideband Code Division Multiple Access ("WCDMA" for short) system, a general packet radio service ("GPRS" for short), a Long Term Evolution ("LTE" for short) system, an LTE frequency division duplex ("FDD" for short) system, an LTE time division duplex ("TDD" for short), a Universal Mobile Telecommunications System ("UMTS" for short), a Worldwide Interoperability for Microwave Access ("WiMAX" for short) communications system, a future 5G system, or the like.

UE in this application may communicate with one or more core networks by using a radio access network (RAN). The UE may be an access terminal, a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a Session Initiation Protocol ("SIP" for short) phone, a wireless local loop ("WLL" for short) station, a personal digital assistant (PDA for short), a handheld device having a wireless communication function, a computing device, another processing device connected to a wireless modem, an in-vehicle device, a wearable device, and UE in a future 5G network.

A network device in this application may be a network side device configured to communicate with user equipment. The network device may be, for example, a base transceiver station ("BTS" for short) in a GSM system or CDMA, or may be a NodeB ("NB" for short) in a WCDMA system, or may be an evolved NodeB ("eNB" or "eNodeB" for short) in an LTE system. Alternatively, the network device may be a donor eNodeB (DeNB for short), a relay station, an access point, an in-vehicle device, a wearable device, and a network side device in a future 5G network or a network side device in a future evolved PLMN network.

Figure 1:
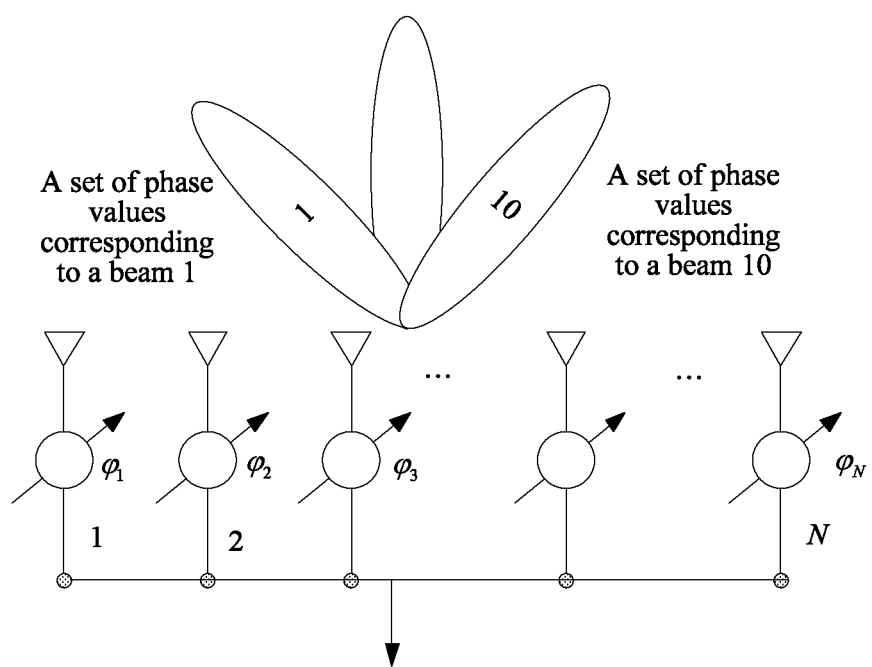
FIG. 1 is a schematic diagram of an N-element uniform linear array phase shifter antenna.

Before this application is described, a basic principle of beam scanning is described first. Excitation phases of array elements are changed by using a method for controlling a phase shift amount of a phase shifter on an array antenna, so as to implement beam scanning. Such a method is referred to as a phase scanning method. The basic principle is shown in FIG. 1. FIG. 1 is a schematic diagram of an N-element uniform linear array phase shifter antenna which is specifically a one-dimensional linear phase shifter receive antenna array (where a transmit antenna array is the same as the receive antenna array, but signal flowing directions are different) formed by N antenna array elements. Phase shift amounts of phase shifters are respectively $\varphi_1, \varphi_2, \ldots, \varphi_N$. By changing the phases $\varphi_1, \varphi_2, \ldots, \varphi_N$ of the phase shifters, the antenna array can form beams pointing to different directions, for example, a beam 1 or a beam 10 in FIG. 1.

Figure 2:
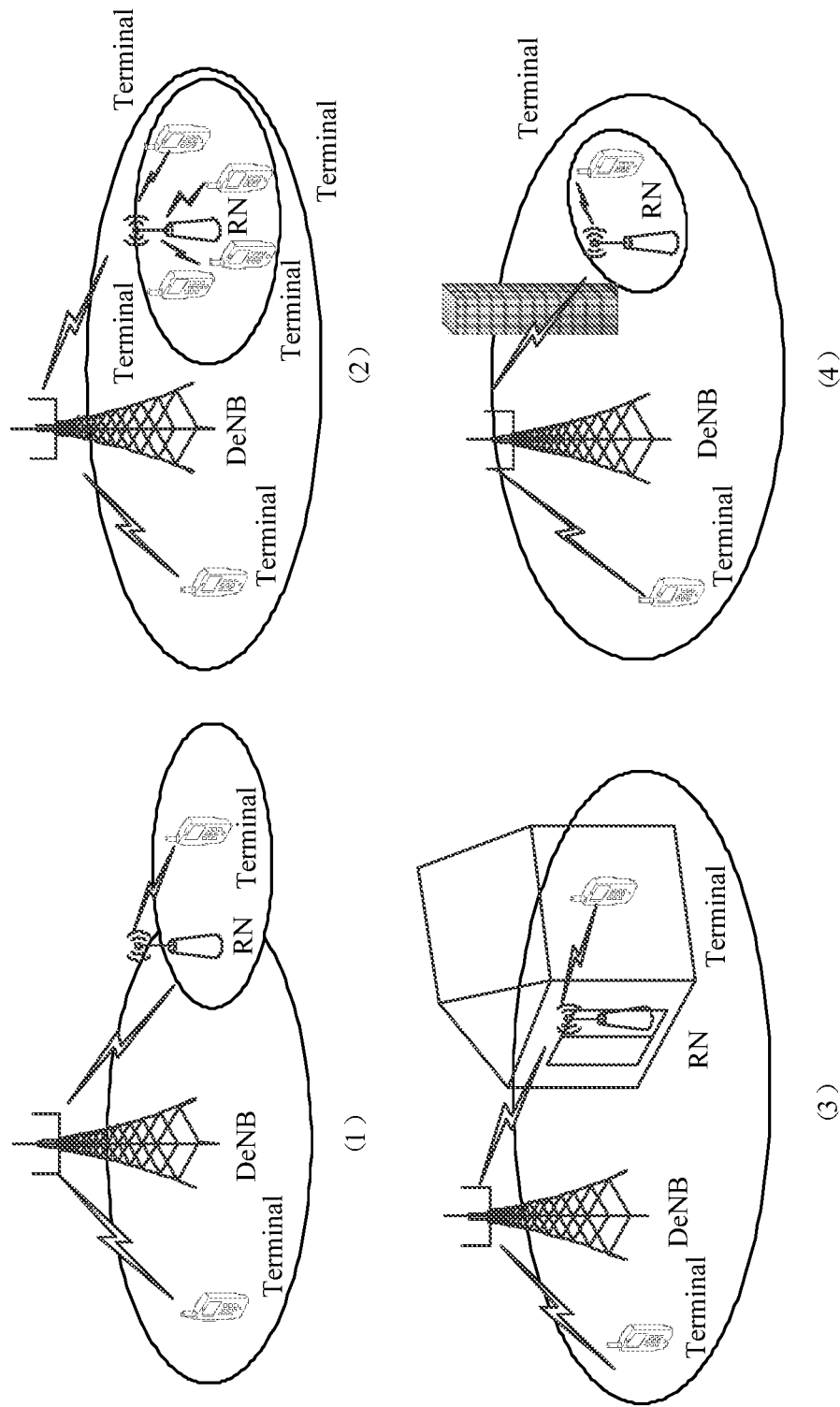
FIG. 2 is architectural diagrams of a system to which a synchronization beam sending method is applied according to this application.

FIG. 2 is architectural diagrams of a system to which a synchronization beam sending method is applied according to this application. In four scenarios shown in FIG. 1, a donor eNodeB (DeNB for short) transmits a signal to a terminal by using a relay node (RN for short). Scenarios (1) and (2) represent line-of-sight (LOS for short) scenarios, that is, there is no obstacle between the DeNB and the terminal. Signal scenarios (3) and (4) represent non-line-of-sight (NLOS for short) scenarios, that is, there is an obstacle between the DeNB and the terminal. In the prior art, if a wide beam is used, fewer beams are needed, and the wide beam is applicable to an LOS scenario and desirably supports a terminal of high mobility; or if a medium beam is used, a signal-to-noise ratio (SNR) is high, and the medium beam is applicable to an NLOS scenario and desirably supports a terminal of low mobility. However, when a wide beam is used, fewer beams are needed and anti-mobility is desirable, but an SNR is low; when a medium beam is used, an SNR is high, but more beams are used in scanning a particular area, large system overheads are caused, and anti-mobility is poor. Therefore, in the prior art, regardless of whether a wide beam or a medium beam is used, requirements of a 5G communications system on both the anti-mobility and the SNR cannot be met.

Based on the foregoing problem, this application provides a synchronization beam sending method in which a wide beam and a medium beam are simultaneously used during synchronization beam scanning, thereby meeting the requirements of the 5G communications system on both the anti-mobility and the SNR.

A core idea of this application is: A wide beam has advantages of smaller overheads and better anti-mobility and an advantage that fewer scanning beams are used when a particular area is scanned, but a disadvantage of a lower SNR; and a medium beam has a feature of a higher SNR, but disadvantages of larger overheads and poorer anti-mobility and a disadvantage that more scanning beams are used when a particular area is scanned. Therefore, in this application, beams of corresponding widths are used in synchronization beam scanning of a network device based on different application scenarios and with reference to respective features of beams of different widths. A wide beam is mainly used for a line-of-sight (LOS) scenario. A large quantity of antennas are needed to form a wide beam, and the wide beam is suitable for synchronization beam scanning for a high-mobility user. A medium beam is mainly used for a non-line-of-sight (NLOS) scenario. A small quantity of antennas are needed to form a medium beam, and the medium beam is suitable for synchronization beam scanning for a low-mobility user.

It should be understood that, a wide beam and a medium beam are relative concepts, and both of the two are ranges. A beam width means that usually there are two or more lobes in an antenna radiation direction. A maximum lobe is referred to as a main lobe, and remaining lobes are referred to as side lobes. An angle between two half power points of the main lobe is defined as a lobe width of an antenna directivity pattern, that is, the beam width. The beam width is related to an antenna shape, a working frequency, and phase distribution. Usually, a larger antenna gain indicates a narrower beam and a higher detection angle resolution. In this application, definitions of the wide beam and the medium beam use concepts of a first beam set (that is, wide beams) and a second beam set (medium beams). A width of a beam in the first beam set is greater than a width of a beam in the second beam set (that is, a width of any beam in the first beam set is greater than a width of any beam in the second beam set), and the two beam sets have no intersection set.

An example is provided for description. For example, widths of beams in the first beam set are greater than 20 degrees, and widths of beams in the second beam set are less than 20 degrees; or widths of beams in the first beam set are greater than 15 degrees, and widths of beams in the second beam set are less than 15 degrees; or widths of beams in the first beam set are greater than 30 degrees, and widths of beams in the second beam set are less than 30 degrees; or widths of beams in the first beam set are greater than 10 degrees, and widths of beams in the second beam set are less than 10 degrees. Provided that there is a case in which a width of any beam in the first beam set is greater than a width of a beam in the second beam set, the case shall fall within the protection scope of this application.

Figure 3:
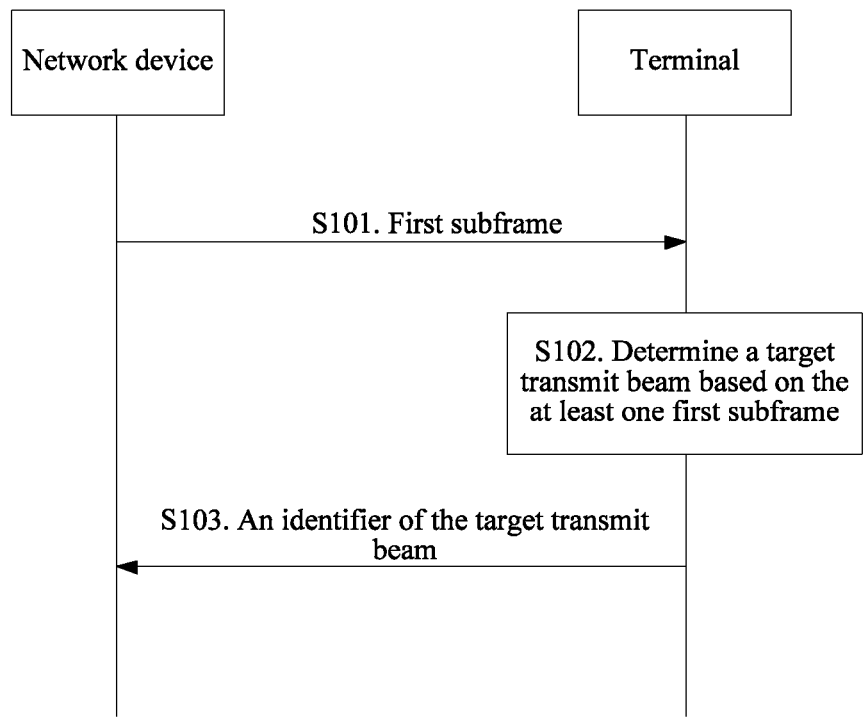
FIG. 3 is an interaction flowchart of Embodiment 1 of a synchronization beam sending and receiving method according to this application.

FIG. 3 is an interaction flowchart of Embodiment 1 of a synchronization beam sending and receiving method according to this application. As shown in FIG. 3, a synchronization beam sending and receiving process is as follows:

S101. A network device sends at least one first subframe to a terminal.

The at least one first subframe includes at least one first beam identifier and at least one second beam identifier, a first beam corresponding to the first beam identifier is a beam in a first beam set, a second beam corresponding to the second beam identifier is a beam in a second beam set, an intersection set of the first beam set and the second beam set is empty, and the beam identifiers of the first beam and the second beam are different.

Specifically, the first beam has the first beam identifier, the second beam has the second beam identifier, and the first beam identifier and the second beam identifier are different, so that the first beam identifier and the second beam identifier can be used to distinguish the first beam from the second beam. It should be understood that, a beam identifier is usually a beam ID, a beam number, or a beam code, and is not limited in this application. Provided that an identifier can uniquely identify a beam, the identifier may be understood as a beam identifier. For example, the first beam identifier may be 0, the second beam identifier may be 1, and the two identifiers can be used to respectively identify the first beam and the second beam.

Figure 4:
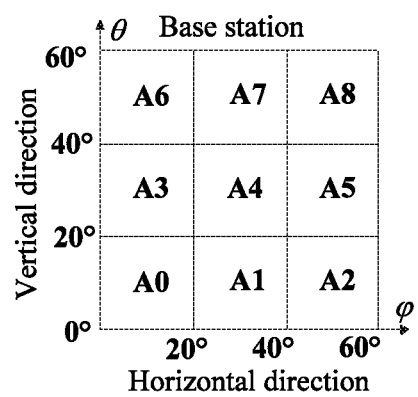
FIG. 4 is a schematic diagram of wide beam coverage of Embodiment 1 of a synchronization beam sending method according to this application.
Figure 5:
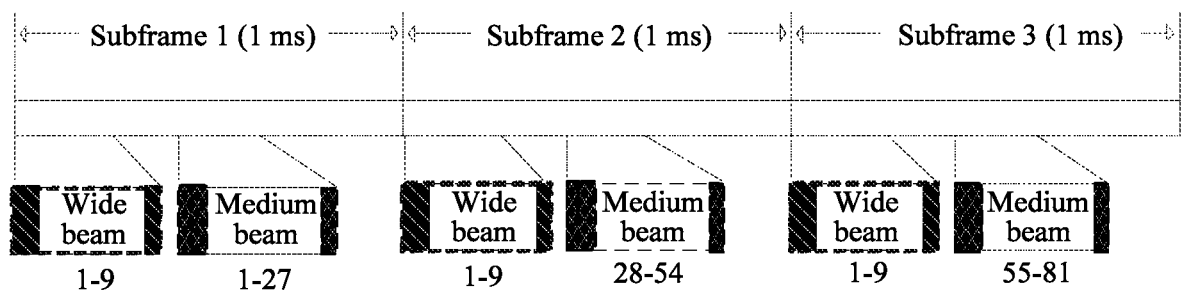
FIG. 5 is a schematic diagram of beam sending of Embodiment 1 of a synchronization beam sending method according to this application.

Specifically, assuming that the network device needs to cover a spatial range whose azimuth and pitch angle are both 60°, and assuming that a beam width of a wide beam is 20° and a beam width of a medium beam is 7°, to cover the spatial range that needs to be covered by the network device, nine wide beams are needed for coverage, and if medium beams are used, 81 medium beams are needed for coverage. Using a wide beam as an example, FIG. 4 is a schematic diagram of wide beam coverage of Embodiment 1 of a synchronization beam sending method according to this application. As shown in FIG. 4, an azimuth and a pitch angle of a spatial range that needs to be covered by the network device are both 60° and correspondingly, nine wide beams A0 to A8 are needed for coverage. Each of the beams A0 to A8 covers a part of area in the spatial range of the network device. FIG. 5 is a schematic diagram of beam sending of Embodiment 1 of a synchronization beam sending method according to this application. As shown in FIG. 5, a subframe 1 sent by the network device includes wide beams and medium beams. The subframe 1 includes all wide beams that cover the spatial range of the network device, and the subframe 1 includes some medium beams that cover the spatial range of the network device, that is, medium beams 1 to 27. Remaining beams of the medium beams are continued to be sent in subsequent subframes. That is, the first beam and the second beam sent by the network device in the at least one first subframe are beams in two beam sets that have no intersection set. The network device sends the wide beams and the medium beams simultaneously, and therefore, can perform wide beam scanning and medium beam scanning simultaneously.

S102. The terminal determines a target transmit beam based on the received first subframe.

In an optional implementation, the terminal selects an optimal transmit beam based on receive power of beams, that is, the target transmit beam. Use of the optimal transmit beam can ensure an optimal signal sending and receiving effect in a signal interaction process between the terminal and the network device. Specifically, the terminal uses a beam of maximum receive power as the target transmit beam based on receive power of the first beam corresponding to the first beam identifier in the received first subframe, and receive power of the second beam corresponding to the second beam identifier in the first subframe.

In addition, the terminal may alternatively select the optimal transmit beam based on SNR values corresponding to different beams, bit error rates of receive channels, quality of service (QoS), or channel quality.

S103. The terminal sends an identifier corresponding to the determined target transmit beam to the network device by using an uplink signal.

After the terminal determines the target transmit beam, that is, the optimal transmit beam, the terminal feeds back an identifier of the optimal transmit beam to the network device, so that the network device performs next-step scheduling and signal sending based on the optimal transmit beam.

In this embodiment, when performing synchronization beam scanning, the network device simultaneously sends beams in two different beam sets in a same subframe, where the two beam sets have no intersection set, for example, sends a wide beam and a medium beam, so that fewer beams are used in beam scanning, anti-mobility is desirable, and an SNR can also be ensured, thereby meeting requirements of a 5G communications system on the anti-mobility and the SNR.

Figure 6:
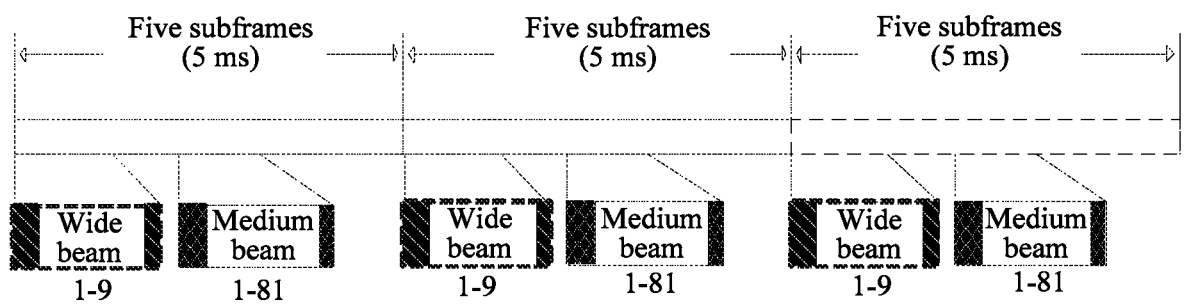
FIG. 6 is a schematic diagram of beam sending of Embodiment 2 of a synchronization beam sending method according to this application.

FIG. 6 is a schematic diagram of beam sending of Embodiment 2 of a synchronization beam sending method according to this application. As shown in FIG. 6, based on the foregoing embodiments, when simultaneously sending the first beam and the second beam, the network device continuously sends the second beam in the second beam set. Specifically, referring to FIG. 6, the network device sends a beam at a period of 5 ms, that is, 5 subframes. In each period, the network device continuously sends all wide beams 1 to 9 (where the wide beams are beams in the first beam set) and all medium beams 1 to 81 (where the medium beams are beams in the second beam set), so that the wide beams sent each time can cover the spatial range of the network device, and the medium beams sent each time can also cover the spatial range of the network device, thereby further ensuring anti-mobility of beam scanning and ensuring an SNR.

It may be learned from the beam sending methods shown in FIG. 5 and FIG. 6, in sending periods of sending the first beam and the second beam by the network device to the terminal, the sending period of the first beam is less than or equal to the sending period of the second beam.

Figure 7:
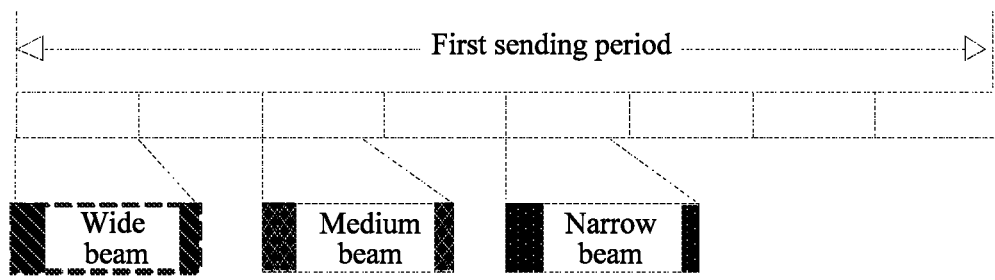
FIG. 7 is a schematic diagram of beam sending of Embodiment 3 of a synchronization beam sending method according to this application.

Based on the foregoing embodiments, this embodiment relates to a method for simultaneously sending beams of three different widths by the network device. That is, FIG. 7 is a schematic diagram of beam sending of Embodiment 3 of a synchronization beam sending method according to this application. As shown in FIG. 7, in one sending period, that is, in a first sending period, the network device simultaneously sends three beams: a wide beam, a medium beam, and a narrow beam. The narrow beam may be considered as a third beam different from the first beam and the second beam, the third beam is a beam in a third beam set, and a width of a beam in the third beam set is less than a width of a beam in the second beam set. An intersection set of the third beam set and the second beam set is empty, and an intersection set of the third beam set and the first beam set is also empty.

In a beam sending method shown in FIG. 7, the first sending period includes at least one subframe. The wide beam and the medium beam may be in a same subframe or in different subframes. The medium beam and the narrow beam may be in a same subframe or in different subframes. When the wide beam, the medium beam, and the narrow beam are simultaneously sent in the first sending period, a time sequence of the wide beam is prior to that of the medium beam, and the time sequence of the medium beam is prior to that of the narrow beam.

In this embodiment, the wide beam, the medium beam, and the narrow beam are simultaneously sent in one sending period. To be specific, widths of beams sent in one sending period gradually decrease, so that an approximate range of the terminal can be first determined by using a wide beam, and then scanning on more precise ranges is performed by using a medium beam and a narrow beam, thereby further meeting requirements on anti-mobility and an SNR.

Figure 8:
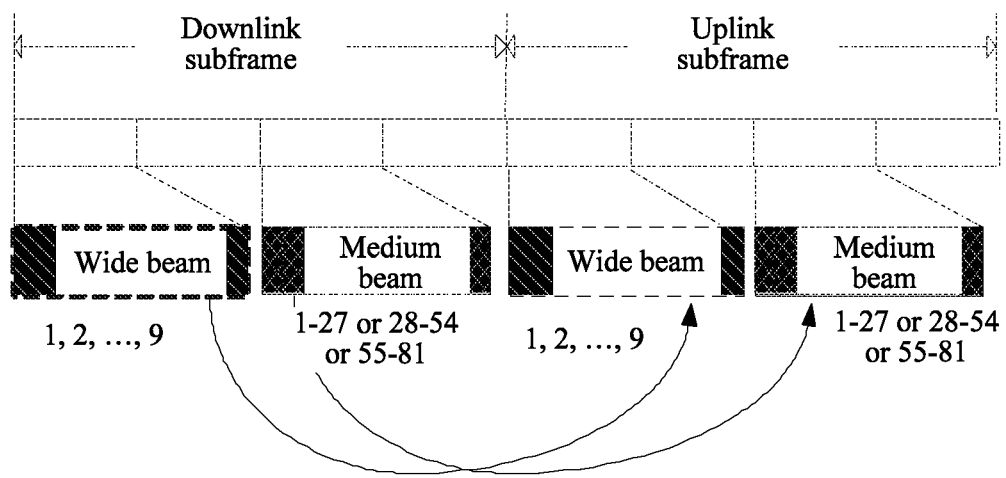
FIG. 8 is schematic diagrams of beam sending and receiving of Embodiment 4 of a synchronization beam sending method according to this application.

Based on the foregoing embodiments, this embodiment relates to a method for feeding back a beam during uplink random access. That is, FIG. 8 is schematic diagrams of beam sending and receiving of Embodiment 4 of a synchronization beam sending method according to this application. As shown in FIG. 8, after downlink beam scanning is completed, uplink channel access is performed by using a wide beam in a next slot. Based on mutual differences of channels, in this case, a beam the same as an optimal downlink transmit beam may be used as an optimal receive beam. For a medium beam, a same method is also used. That is, during uplink channel access, the network device receives at least one second subframe, that is, a subframe corresponding to the downlink subframe in FIG. 7. In the at least one second subframe, there is at least one fourth beam and at least one fifth beam. The fourth beam corresponds to the first beam, and the fifth beam corresponds to the second beam. Moreover, a width of the fourth beam is equal to a width of the first beam, and a width of the fifth beam is equal to a width of the second beam.

Figure 9:
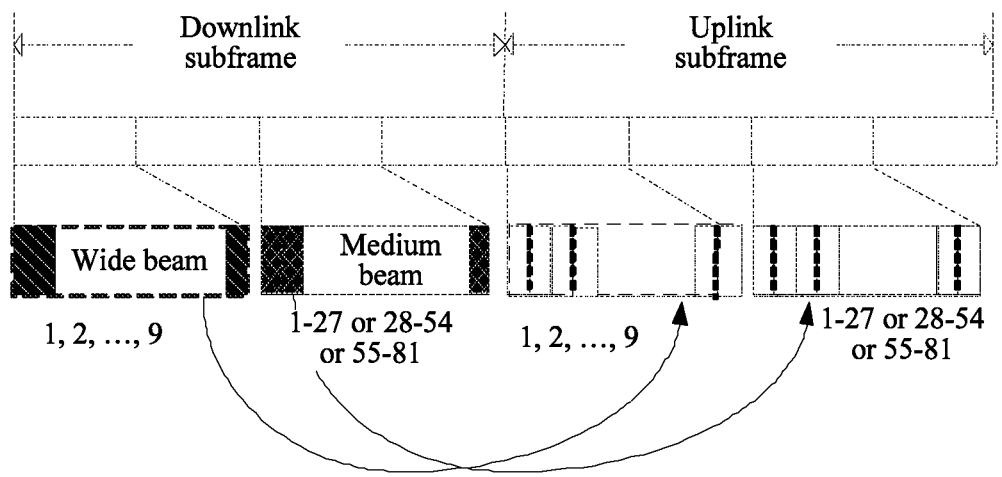
FIG. 9 is schematic diagrams of beam sending and receiving of Embodiment 5 of a synchronization beam sending method according to this application.
Figure 10:
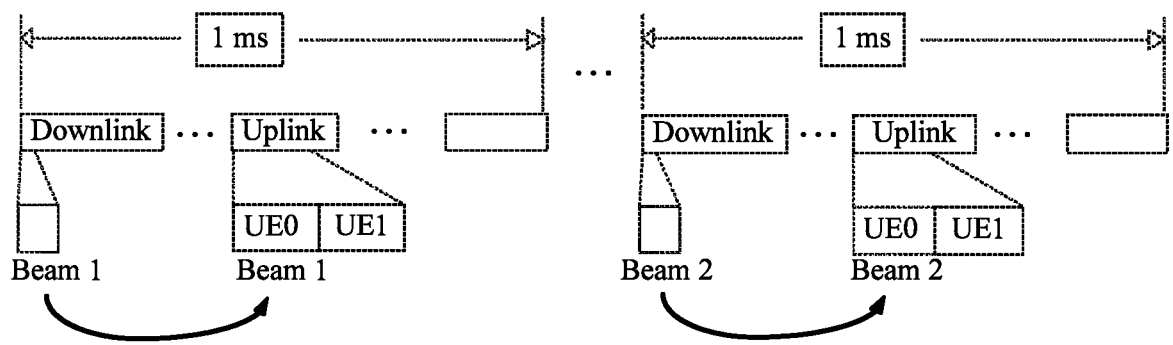
FIG. 10 is schematic diagrams of uplink and downlink frame structures of Embodiment 5 of a synchronization beam sending method according to this application.

FIG. 9 is schematic diagrams of beam sending and receiving of Embodiment 5 of a synchronization beam sending method according to this application. FIG. 10 is schematic diagrams of uplink and downlink frame structures of Embodiment 5 of a synchronization beam sending method according to this application. As shown in FIG. 9 and FIG. 10, in addition to the beam sending method performed during uplink channel access shown in FIG. 8, in the methods shown in FIG. 9 and FIG. 10, the network device may receive two medium beams corresponding to one downlink wide beam during uplink channel access. Specifically, in at least one third subframe received by the network device, that is, in a subframe corresponding to the downlink subframe shown in FIG. 9, there are at least two sixth beams and at least two seventh beams. Every two sixth beams correspond to one first beam, and every two seventh beams correspond to one second beam. A width of the sixth beam is less than a width of the first beam, and a width of the seventh beam is less than a width of the second beam. As shown in FIG. 10, two beams that are in an uplink channel and that correspond to a beam 1 in a downlink channel may be two beams fed back by two terminals. The beam 1 in FIG. 9 may be the first beam or the second beam described above, and a beam 2 may also be the first beam or the second beam described above.

In this embodiment, two beams corresponding to one beam in a downlink subframe are added during uplink channel access, so that more terminals can be scanned, thereby further increasing user access efficiency.

Figure 11:
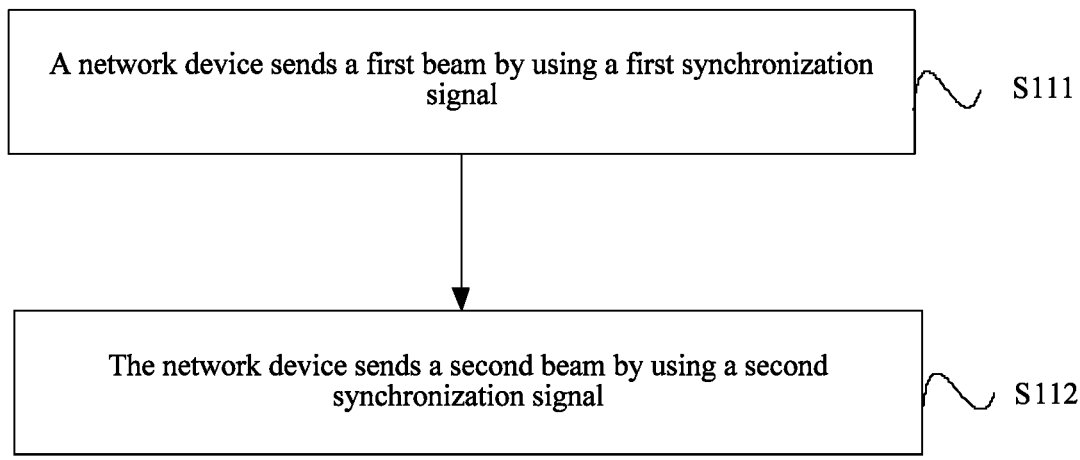
FIG. 11 is a schematic diagram of beam sending of Embodiment 6 of a synchronization beam sending method according to this application.

Based on the foregoing embodiments, this embodiment relates to a specific method for sending a synchronization beam by a network device. That is, FIG. 11 is a schematic diagram of beam sending of Embodiment 6 of a synchronization beam sending method according to this application. As shown in FIG. 11, a beam sending process of the network device is as follows:

S111. The network device sends the first beam by using a first synchronization signal.

S112. The network device sends the second beam by using a second synchronization signal.

In a specific execution manner, a synchronization sequence used by the first synchronization signal is different from a synchronization sequence used by the second synchronization signal.

Specifically, the first synchronization signal and the second synchronization signal implement code division by using different synchronization sequences. The used synchronization sequences may be, for example, a Zadoff-Chu sequence. The Zadoff-Chu sequence has desirable autocorrelation and low cross-correlation, so that the sequence can be used to generate a synchronization signal. In this embodiment, different sequences generated by cyclically shifting a basic sequence are used to generate the first synchronization signal and the second synchronization signal. The generated Zadoff-Chu sequences are different, and therefore, a generated first synchronization sequence and a generated second synchronization sequence can be distinguished from each other, thereby ensuring that a receive end correctly identifies the first beam and the second beam.

In another specific execution manner, the first synchronization signal and the second synchronization signal are located in different frequency bands.

Figure 12:
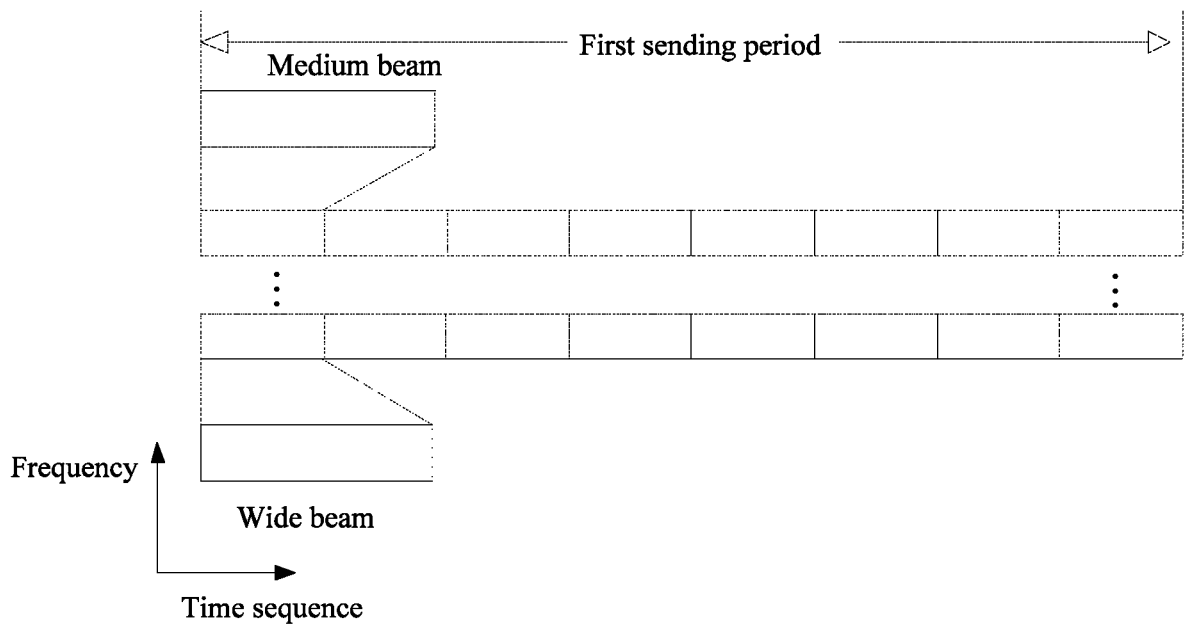
FIG. 12 is a schematic diagram of beam sending of Embodiment 7 of a synchronization beam sending method according to this application.

Specifically, the first synchronization signal and the second synchronization signal implement code division by being located in different frequency bands. FIG. 12 is a schematic diagram of beam sending of Embodiment 7 of a synchronization beam sending method according to this application. As shown in FIG. 12, in a first sending period, a wide beam and a medium beam are sent at different frequencies, so that the wide beam and the medium beam can be correctly distinguished.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a ROM, a RAM, a magnetic disk, or an optical disc.

Figure 13:
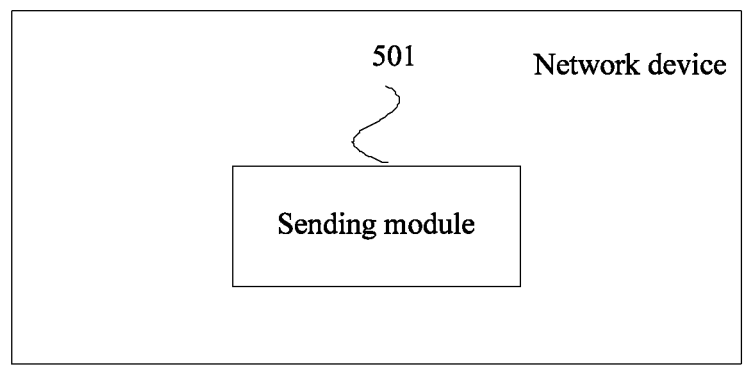
FIG. 13 is a structural modular diagram of Embodiment 1 of a network device according to an embodiment of the present invention.

FIG. 13 is a structural modular diagram of Embodiment 1 of a network device according to an embodiment of the present invention. As shown in FIG. 13, the network device includes:

a sending module 501, configured to send at least one first subframe to a terminal, where the at least one first subframe includes at least one first beam identifier and at least one second beam identifier, a first beam corresponding to the first beam identifier is a beam in a first beam set, a second beam corresponding to the second beam identifier is a beam in a second beam set, an intersection set of the first beam set and the second beam set is empty, and the first beam identifier and the second beam identifier are different.

Implementation principles and technical effects of the network device are similar to those of the method embodiments described above, and details are not described herein again.

Optionally, widths of beams in the first beam set are greater than widths of beams in the second beam set.

Optionally, the at least one first subframe further includes at least one third beam identifier, a third beam corresponding to the third beam identifier is a beam in a third beam set, and widths of beams in the third beam set are less than widths of beams in the second beam set.

Optionally, a sending period of the first beam is less than or equal to a sending period of the second beam.

Figure 14:
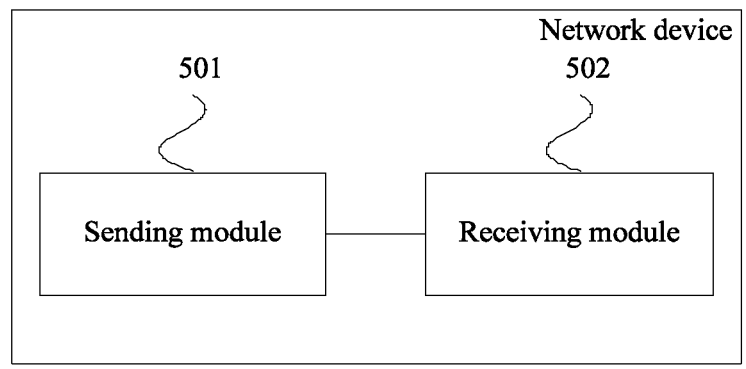
FIG. 14 is a structural modular diagram of Embodiment 2 of a network device according to an embodiment of the present invention.

FIG. 14 is a structural modular diagram of Embodiment 2 of a network device according to an embodiment of the present invention. As shown in FIG. 14, based on FIG. 13, the network device further includes:

a receiving module 502, configured to receive at least one second subframe sent by the terminal, where the at least one second subframe includes at least one fourth beam identifier and at least one fifth beam identifier, a fourth beam corresponding to the fourth beam identifier corresponds to the first beam, a fifth beam corresponding to the fifth beam identifier corresponds to the second beam, a width of the fourth beam is equal to a width of the first beam, and a width of the fifth beam is equal to a width of the second beam.

Optionally, the receiving module 502 is further configured to receive at least one third subframe sent by the terminal, where the at least one third subframe includes at least two sixth beam identifiers and at least two seventh beam identifiers, two sixth beams corresponding to every two sixth beam identifiers correspond to one first beam, two seventh beams corresponding to every two seventh beam identifiers correspond to one second beam, a width of the sixth beam is less than a width of the first beam, and a width of the seventh beam is less than a width of the second beam.

Figure 15:
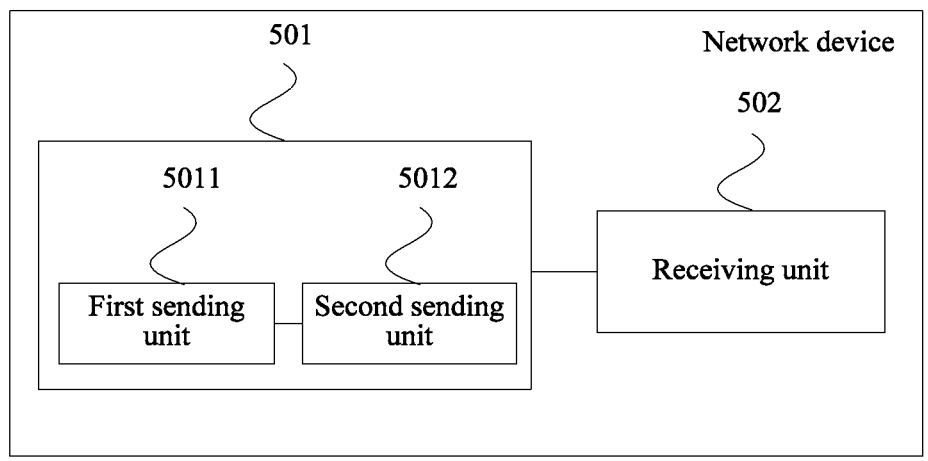
FIG. 15 is a structural modular diagram of Embodiment 3 of a network device according to an embodiment of the present invention.

FIG. 15 is a structural modular diagram of Embodiment 3 of a network device according to an embodiment of the present invention. As shown in FIG. 15, the sending module 501 includes:

a first sending unit 5011, configured to send the first beam by using a first synchronization signal; and a second sending unit 5012, configured to send the second beam by using a second synchronization signal.

In another embodiment, a synchronization sequence used by the first synchronization signal is different from a synchronization sequence used by the second synchronization signal.

In another embodiment, the first synchronization signal and the second synchronization signal are located in different frequency bands.

In another embodiment, the synchronization sequences used by the first synchronization signal and the second synchronization signal are different Zadoff-Chu sequences generated after cyclic shifts.

It should be understood that, the network devices shown in FIG. 13 to FIG. 15 are apparatus embodiments corresponding to the foregoing method embodiments, and the description of the method embodiments is also applicable to the apparatus embodiments. Related description is not repeatedly described herein again.

Figure 16:
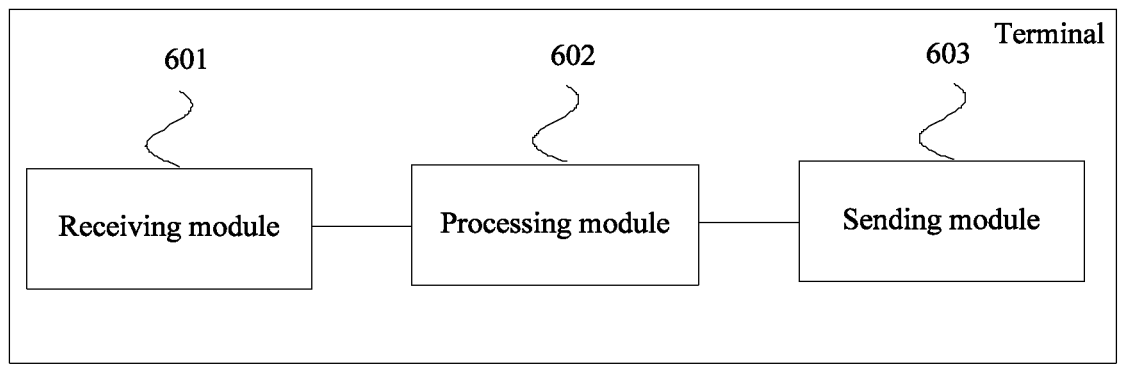
FIG. 16 is a structural modular diagram of Embodiment 1 of a terminal according to this application.

FIG. 16 is a structural modular diagram of Embodiment 1 of a terminal according to this application. As shown in FIG. 16, the terminal includes:

a receiving module 601, configured to receive at least one first subframe sent by a network device, where the at least one first subframe includes at least one first beam identifier and at least one second beam identifier, a first beam corresponding to the first beam identifier is a beam in a first beam set, a second beam corresponding to the second beam identifier is a beam in a second beam set, an intersection set of the first beam set and the second beam set is empty, and the first beam identifier and the second beam identifier are different;

a processing module 602, configured to determine a target transmit beam based on the at least one first subframe; and a sending module 603, configured to send a target transmit beam identifier corresponding to the target transmit beam to the network device.

Specifically, the processing module 602 is specifically configured to:

use a beam of maximum receive power as the target transmit beam based on receive power of the first beam corresponding to the first beam identifier in the received first subframe, and receive power of the second beam corresponding to the second beam identifier in the first subframe.

It should be understood that, the terminal shown in FIG. 16 is an apparatus embodiment corresponding to the foregoing method embodiments, and the description of the method embodiments is also applicable to the apparatus embodiment. Related description is not repeatedly described herein again.

Figure 17:
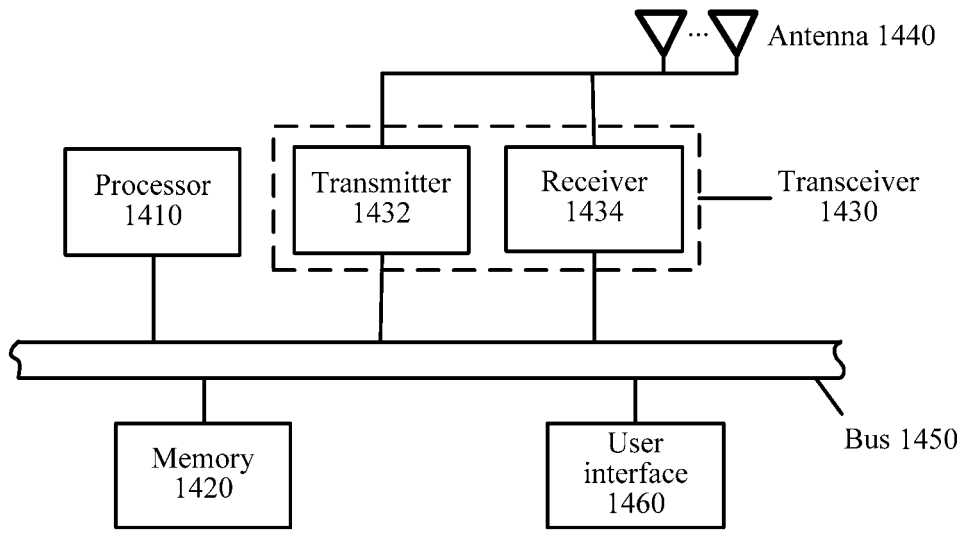
FIG. 17 is a schematic block diagram of a network device according to this application.

FIG. 17 is a schematic block diagram of a network device 1400 according to this application. As shown in FIG. 17, the network device 1400 includes a processor 1410, a memory 1420, a transceiver 1430, an antenna 1440, a bus 1450, and a user interface 1460.

Specifically, the processor 1410 controls operations of the network device 1400, and the processor may be a general-purpose processor, a digital signal processor, an application-specific integrated circuit, a field programmable gate array, or another programmable logic device.

The transceiver 1430 includes a transmitter 1432 and a receiver 1434. The transmitter 1432 is configured to transmit a signal, and the receiver 1434 is configured to receive a signal. There may be one or more antennas 1440. The network device 1400 may further include a user interface 1460, for example, a keyboard, a microphone, a speaker, and/or a touchscreen. The user interface 1460 may transfer content and control operations to the network device 1400.

Components of the network device 1400 are coupled together by using the bus 1450. In addition to a data bus, the bus 1450 includes a power bus, a control bus, and a status signal bus. However, for clear description, various types of buses in the figure are marked as the bus 1450. It should be noted that the description of the network element structures described above may be applied to this embodiment of this application.

The memory 1420 may include a read-only memory (ROM) and a random access memory (RAM), or another type of dynamic storage device that may store information and an instruction, or may be a magnetic disk storage. The memory 1420 may be configured to store an instruction used to implement the related method provided in this application. It may be understood that, an executable instruction is encoded or loaded into the processor 1410 of the network device 1400 through buffering or long-term storage. In a specific embodiment, the memory 1410 is configured to store computer executable program code, the program code includes an instruction, and when the processor 1410 executes the instruction, the instruction enables the network device to perform the following operation:

sending at least one first subframe to a terminal, where the at least one first subframe includes at least one first beam identifier and at least one second beam identifier, a first beam corresponding to the first beam identifier is a beam in a first beam set, a second beam corresponding to the second beam identifier is a beam in a second beam set, an intersection set of the first beam set and the second beam set is empty, and the first beam identifier and the second beam identifier are different.

For a specific implementation of the operations performed by the processor included in the network device, refer to the corresponding steps performed by the network device in Embodiment 1. Details are not repeatedly described again in this application.

Figure 18:
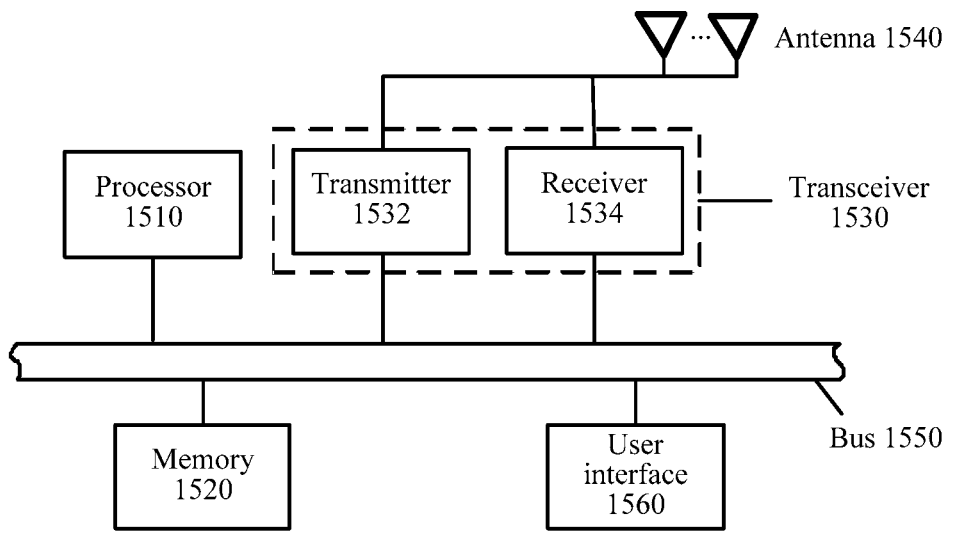
FIG. 18 is a schematic block diagram of a terminal according to this application.

FIG. 18 is a schematic block diagram of a terminal according to this application. As shown in FIG. 18, the terminal 1500 includes a processor 1510, a memory 1520, a transceiver 1530, an antenna 1540, a bus 1550, and a user interface 1560.

Specifically, the processor 1510 controls operations of the terminal 1500, and the processor may be a general-purpose processor, a digital signal processor, an application-specific integrated circuit, a field programmable gate array, or another programmable logic device.

The transceiver 1530 includes a transmitter 1532 and a receiver 1534. The transmitter 1532 is configured to transmit a signal, and the receiver 1534 is configured to receive a signal. There may be one or more antennas 1540. The terminal 1500 may further include a user interface 1560, for example, a keyboard, a microphone, a speaker, and/or a touchscreen. The user interface 1560 may transfer content and control operations to the network device 1500.

Components of the terminal 1500 are coupled together by using the bus 1550. In addition to a data bus, the bus system 1550 includes a power bus, a control bus, and a status signal bus. However, for clear description, various types of buses in the figure are marked as the bus system 1550. It should be noted that the description of the network element structures described above may be applied to this embodiment of this application.

The memory 1520 may include a read-only memory (ROM) and a random access memory (RAM), or another type of dynamic storage device that may store information and an instruction, or may be a magnetic disk storage. The memory 1520 may be configured to store an instruction used to implement the related method provided in this application. It may be understood that, an executable instruction is encoded or loaded into the processor 1510 of the terminal 1500 through buffering or long-term storage. In a specific embodiment, the memory 1510 is configured to store computer executable program code, the program code includes an instruction, and when the processor 1510 executes the instruction, the instruction enables the network device to perform the following operations:

receiving at least one first subframe sent by a network device, where the at least one first subframe includes at least one first beam identifier and at least one second beam identifier, a first beam corresponding to the first beam identifier is a beam in a first beam set, a second beam corresponding to the second beam identifier is a beam in a second beam set, an intersection set of the first beam set and the second beam set is empty, and the first beam identifier and the second beam identifier are different;

determining a target transmit beam based on the at least one first subframe; and sending a target transmit beam identifier corresponding to the target transmit beam to the terminal.

For a specific implementation of the operations performed by the processor included in the terminal, refer to the corresponding steps performed by the terminal in Embodiment 1. Details are not repeatedly described again in this application.

This application further provides a computer storage medium, configured to store computer software instructions used by the foregoing network device. The computer storage medium includes a program designed for executing the foregoing aspects.

This application further provides a computer storage medium, configured to store computer software instructions used by the terminal. The computer storage medium includes a program designed for executing the foregoing aspects.

What is claimed is:

1. A synchronization beam sending method, comprising:
sending, by a network device, at least one first subframe to a terminal, wherein the at least one first subframe comprises at least one first beam identifier at least one second beam identifier, and at least one third beam identifier, wherein a first beam corresponding to the first beam identifier is a beam in a first beam set, wherein a second beam corresponding to the second beam identifier is a beam in a second beam set, wherein an intersection set of the first beam set and the second beam set is empty, wherein the first beam identifier and the second beam identifier are different, wherein a third beam corresponding to the third beam identifier is a beam in a third beam set, and wherein widths of beams in the third beam set are less than widths of beams in the second beam set.

2. The method according to claim 1, wherein widths of beams in the first beam set are greater than widths of beams in the second beam set.

3. The method according to claim 1, wherein a sending period of the first beam is less than or equal to a sending period of the second beam.

4. The method according to claim 1, further comprising:
receiving, by the network device, at least one second subframe sent by the terminal, wherein the at least one second subframe comprises at least one fourth beam identifier and at least one fifth beam identifier, wherein a fourth beam corresponding to the fourth beam identifier corresponds to the first beam, wherein a fifth beam corresponding to the fifth beam identifier corresponds to the second beam, wherein a width of the fourth beam is equal to a width of the first beam, and wherein a width of the fifth beam is equal to a width of the second beam.

5. The method according to claim 1, further comprising:
receiving, by the network device, at least one third subframe sent by the terminal, wherein the at least one third subframe comprises at least two sixth beam identifiers and at least two seventh beam identifiers, wherein two sixth beams corresponding to every two sixth beam identifiers correspond to one first beam, wherein two seventh beams corresponding to every two seventh beam identifiers correspond to one second beam, wherein a width of the sixth beam is less than a width of the first beam, and wherein a width of the seventh beam is less than a width of the second beam.

6. The method according to claim 1, further comprising:
sending, by the network device, the first beam by using a first synchronization signal; and
sending, by the network device, the second beam by using a second synchronization signal.

7. The method according to claim 6, wherein a synchronization sequence used by the first synchronization signal is different from a synchronization sequence used by the second synchronization signal.

8. The method according to claim 6, wherein the first synchronization signal and the second synchronization signal are located in different frequency bands.

9. A synchronization beam receiving method, comprising:
receiving, by a terminal, at least one first subframe sent by a network device, wherein the at least one first subframe comprises at least one first beam identifier and at least one second beam identifier, wherein a first beam corresponding to the first beam identifier is a beam in a first beam set, wherein a second beam corresponding to the second beam identifier is a beam in a second beam set, wherein an intersection set of the first beam set and the second beam set is empty, wherein the first beam identifier and the second beam identifier are different;
determining, by the terminal, a target transmit beam based on the at least one first subframe, wherein determining the target transmit beam comprises using, by the terminal, a beam of maximum receive power as the target transmit beam based on receive power of the first beam corresponding to the first beam identifier in the at least one first subframe, and receive power of the second beam corresponding to the second beam identifier in the at least one first subframe; and
sending, by the terminal, a target transmit beam identifier corresponding to the target transmit beam to the network device.

10. A network device, comprising:
a transmitter, the transmitter configured to send at least one first subframe to a terminal, wherein the at least one first subframe comprises at least one first beam identifier, at least one second beam identifier, and at least one third beam identifier, wherein a first beam corresponding to the first beam identifier is a beam in a first beam set, wherein a second beam corresponding to the second beam identifier is a beam in a second beam set, wherein an intersection set of the first beam set and the second beam set is empty, wherein the first beam identifier and the second beam identifier are different, wherein a third beam corresponding to the third beam identifier is a beam in a third beam set, and wherein widths of beams in the third beam set are less than widths of beams in the second beam set.

11. The network device according to claim 10, wherein widths of beams in the first beam set are greater than widths of beams in the second beam set.

12. The network device according to claim 10, wherein a sending period of the first beam is less than or equal to a sending period of the second beam.

13. The network device according to claim 10, further comprising:
a receiver, the receiver configured to receive at least one second subframe sent by the terminal, wherein the at least one second subframe comprises at least one fourth beam identifier and at least one fifth beam identifier, wherein a fourth beam corresponding to the fourth beam identifier corresponds to the first beam, wherein a fifth beam corresponding to the fifth beam identifier corresponds to the second beam, wherein a width of the fourth beam is equal to a width of the first beam, and wherein a width of the fifth beam is equal to a width of the second beam.

14. The network device according to claim 10, further comprising:
a receiver, the receiver configured to receive at least one third subframe sent by the terminal, wherein the at least one third subframe comprises at least two sixth beam identifiers and at least two seventh beam identifiers, wherein two sixth beams corresponding to every two sixth beam identifiers correspond to one first beam, wherein two seventh beams corresponding to every two seventh beam identifiers correspond to one second beam, wherein a width of the sixth beam is less than a width of the first beam, and wherein a width of the seventh beam is less than a width of the second beam.

15. The network device according to claim 10, wherein the transmitter is configured to:
send the first beam by using a first synchronization signal; and
send the second beam by using a second synchronization signal.

16. The network device according to claim 15, wherein a synchronization sequence used by the first synchronization signal is different from a synchronization sequence used by the second synchronization signal.

17. The network device according to claim 15, wherein the first synchronization signal and the second synchronization signal are located in different frequency bands.

18. The method according to claim 9, wherein widths of beams in the first beam set are greater than widths of beams in the second beam set.

19. The method according to claim 9, wherein the at least one first subframe further comprises at least one third beam identifier, wherein a third beam corresponding to the third beam identifier is a beam in a third beam set, and wherein widths of beams in the third beam set are less than widths of beams in the second beam set.

20. The method according to claim 9, wherein a sending period of the first beam is less than or equal to a sending period of the second beam.

* * * * *